United States Patent [19]
Nishii et al.

[11] Patent Number: 5,924,530
[45] Date of Patent: Jul. 20, 1999

[54] HYDRAULIC BRAKE APPARATUS FOR A VEHICLE

[75] Inventors: Michiharu Nishii, Toyota; Satoshi Ishida, Chiryu; Masahiko Kato, Toyoake, all of Japan

[73] Assignees: Aisin Seiki Kabushiki Kaisha, Kariya; Toyota Jidosha Kabushiki Kaisha, Toyota, both of Japan

[21] Appl. No.: 08/866,242

[22] Filed: May 30, 1997

[30] Foreign Application Priority Data

May 31, 1996 [JP] Japan .................................. 8-160846

[51] Int. Cl.$^6$ ...................................................... B60T 11/00
[52] U.S. Cl. ................................ 188/358; 60/562; 303/10
[58] Field of Search ..................................... 188/358, 359, 188/345; 303/113.1, 114.2, 114.3, 116.1, 114.1, 50, 10, 52, 68–69; 60/547.1, 547.2, 547.3, 562, 552, 581, 592, 563, 591, 555

[56] References Cited

U.S. PATENT DOCUMENTS

| | | | |
|---|---|---|---|
| 3,885,391 | 5/1975 | Campbell et al. | 60/581 |
| 3,928,970 | 12/1975 | Farr . | |
| 4,449,369 | 5/1984 | Dauvergne | 60/563 |
| 4,637,208 | 1/1987 | Kervagoret | 60/547.1 |
| 4,643,488 | 2/1987 | Reinartz | 303/114.1 |
| 4,674,805 | 6/1987 | Leiber | 303/114.1 |
| 4,793,660 | 12/1988 | Becker et al. | 303/114.1 |
| 4,874,207 | 10/1989 | Nishii et al. | 188/358 |
| 4,884,492 | 12/1989 | Maehara . | |
| 4,904,026 | 2/1990 | Bernhardt et al. | 303/114.1 |
| 5,098,172 | 3/1992 | Maehara | 188/358 |

FOREIGN PATENT DOCUMENTS

| | | |
|---|---|---|
| 37 37 727 | 5/1989 | Germany . |
| 2 170 874 | 8/1986 | United Kingdom . |

*Primary Examiner*—Douglas C. Butler
*Attorney, Agent, or Firm*—Burns, Doane, Swecker & Mathis, L.L.P.

[57] ABSTRACT

The invention is directed to a hydraulic brake apparatus which includes a master cylinder having a cylinder body and a master piston slidably disposed therein for defining a pressure chamber ahead of the master piston and a power chamber behind the master piston. A control piston is slidably disposed in the cylinder body ahead of the master piston for defining the pressure chamber behind the control piston. The control piston is moved in response to movement of the master piston. An auxiliary pressure source is provided for pressurizing brake fluid to generate a power pressure. A valve assembly is communicated with the auxiliary pressure source to regulate the power pressure into a regulated pressure in response to movement of the control piston, and adapted to supply the regulated pressure into the power chamber to assist the operation of a brake pedal. And, a pressure decreasing device which is activated in response to operation of the brake pedal is provided for decreasing the pressure in the power chamber irrespective of the pressure in the pressure chamber when the brake pedal is released. For example, the pressure decreasing device is disposed in the master piston for communicating the power chamber with the reservoir or blocking the communication between the power chamber and the reservoir in accordance with a position of the master piston in the cylinder body.

11 Claims, 2 Drawing Sheets

HYDRAULIC BRAKE APPARATUS FOR A VEHICLE

BACKGROUND OF THE INVENTION

1. Field of the Invention

The present invention relates to a hydraulic brake apparatus for a vehicle, and more particularly to the apparatus having an auxiliary pressure source for generating a power pressure and a valve assembly for regulating the power pressure into a regulated pressure.

2. Description of the Related Arts

As for the hydraulic brake apparatus having the auxiliary pressure source and the valve assembly, the U.S. Pat. No. 3,928,970 discloses power-assisted master cylinder assemblies which comprise a piston movable in a cylinder bore, a pressure space ahead of the piston having an outlet for connection to a brake circuit, a power chamber behind the piston having an inlet for connection to a source of fluid under pressure, and a control valve assembly for controlling the supply of fluid from the pressure source to the power chamber. It is an object of the invention disclosed in the above United States Patent to provide a power-assisted master cylinder assembly in which the piston is pedal operated but which does not require a movable inlet or inlet seals which move under pressure. According to the assembly as disclosed above, the power-assisted master cylinder includes a pedal operated first piston for pressurizing the pressure space connected to the brake circuit, and a second piston for operating valve means controlling the fluid assisting the pedal, movement of the first piston being transmitted to the second piston either hydraulically or mechanically. In the assembly, one end of the second piston is exposed to the pressure in the pressure space and the other end is exposed to the pressure of the assisting fluid.

In the UK Patent Application GB2170874 discloses servo-assisted master cylinder assemblies having a master cylinder with primary and secondary pistons, with a servo chamber defined behind the primary piston, and having valve means provided with a spool for controlling pressurization of the servo chamber from a source of pressure fluid.

According to the assemblies as disclosed in the above publications, the control valve (or regulator valve) is controlled by the master cylinder pressure. When the wheel cylinder pressure is increased or decreased in response to depression of the brake pedal, the control valve is actuated to assist the operation of the brake pedal after the wheel cylinder pressure was increased or decreased by the master cylinder. Therefore, even if the brake pedal is released during the braking operation, for example, the pressure in the power chamber can not be decreased immediately after the brake pedal was released, because the frictional force of sealing members mounted on the master piston is large. Only after the depressing force to the brake pedal was reduced to overcome the frictional force of sealing members, the pressure comes to be reduced. As far as conventional resilient sealing members are used, the frictional force is likely to exceed a limit to cause a delay in pressure decreasing operation.

SUMMARY OF THE INVENTION

Accordingly, it is an object of the present invention to provide a hydraulic brake apparatus for a vehicle, which includes a master cylinder, an auxiliary pressure source for generating a power pressure and a valve assembly for regulating the power pressure into a regulated pressure and supplying the regulated pressure to a power chamber defined behind a master piston to assist operation of a manually operated member, and which is adapted to decrease the pressure in the power chamber immediately after the manually operated member is released.

In accomplishing the above and other objects, a hydraulic brake apparatus for a vehicle includes a master cylinder having a cylinder body and a master piston slidably disposed therein for defining a pressure chamber ahead of the master piston and a power chamber behind the master piston. The master piston is moved forward in response to operation of a manually operated member, e.g., a brake pedal, to generate a brake pressure from the pressure chamber. A control piston is slidably disposed in the cylinder body ahead of the master piston for defining the pressure chamber behind the control piston. The control piston is moved in response to movement of the master piston. An auxiliary pressure source is provided for pressurizing brake fluid to generate a power pressure. A valve assembly is communicated with the auxiliary pressure source for regulating the power pressure into a regulated pressure in response to movement of the control piston. The valve assembly is adapted to supply the regulated pressure into the power chamber to assist the operation of the manually operated member. And, a pressure decreasing device which is activated in response to operation of the manually operated member is provided for decreasing the pressure in the power chamber irrespective of the pressure in the pressure chamber when the manually operated member is released. The pressure decreasing device may be disposed in the master piston in an integral relationship with the manually operated member.

In the above-described apparatus, it is preferable that the valve assembly is adapted to keep the power chamber in communication with a reservoir for storing the brake fluid therein when the manually operated member is in its inoperative condition, and that the pressure decreasing device is adapted to communicate the power chamber with the reservoir when the manually operated member is in its inoperative condition, and adapted to block the communication between the power chamber and the reservoir when the manually operated member is operated, and adapted to communicate the power chamber with the reservoir when the manually operated member is released.

Or, the above-described apparatus may be so arranged that the valve assembly is adapted to keep the power chamber in communication with a reservoir for storing brake fluid therein when the manually operated member is in its inoperative condition, and that the pressure decreasing device is adapted to block the communication between the power chamber and the reservoir when the manually operated member is in its inoperative condition and when the manually operated member is operated, and adapted to communicate the power chamber with the reservoir when the manually operated member is released.

Preferably, the pressure decreasing device is disposed in the master piston for providing one of a first state of communicating the power chamber with the reservoir, and a second state of blocking the communication between the power chamber and the reservoir, in accordance with a position of the master piston in the cylinder body. The pressure decreasing device may be disposed in the master piston for providing one of a first state of communicating the power chamber with the reservoir, and a second state of blocking the communication between the power chamber and the reservoir, in dependence upon the pressure in the power chamber.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENTS

Figure 1:
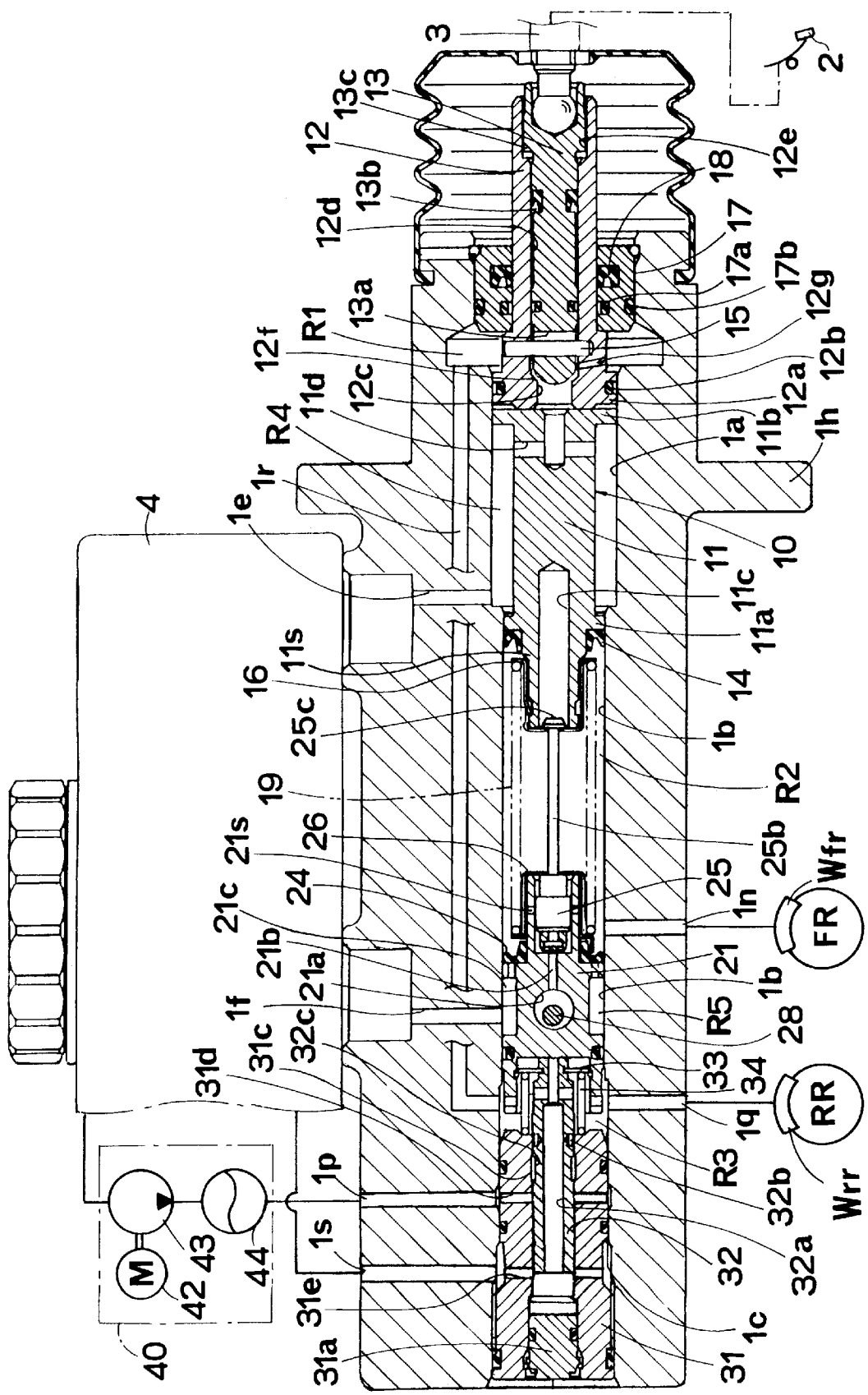
FIG. 1 is a sectional view of a hydraulic brake apparatus for a vehicle according to an embodiment of the present invention.

Referring to FIG. 1, there is illustrated a hydraulic brake apparatus for a vehicle, which includes a cylinder body $1h$ provided with a master cylinder section and a regulator section, and which includes a brake pedal 2 which is disposed behind the cylinder body $1h$ (the right in FIG. 1) as a manually operated member according to the present invention. A depressing force applied on the brake pedal 2 is transmitted as a braking force to the master cylinder section and the regulator section through a push rod 3. In response to the depressing force, a hydraulic pressure is generated in the master cylinder section and the regulator section, and applied to wheel cylinders Wfr, Wfl, Wrr, Wrl which are operatively mounted on front wheels FR, FL and rear wheels RR, RL of the vehicle. In FIG. 1, there are disclosed only the wheels FR, RR which are located at the front right and rear right of the vehicle, and the wheel cylinders Wfr, Wrr which are operatively mounted on the wheels FR, RR.

In the cylinder body $1h$, there is formed a stepped bore which includes bores $1a$, $1b$, $1c$ having different diameters from one another, and in which a master piston 10 and a control piston 21 are received to define therebetween a pressure chamber R2. The bore $1a$ is communicated with a power chamber R1 having a larger diameter than that of the bore $1a$. The control piston 21 is fluid-tightly and slidably received in the bore $1b$ having the smallest diameter.

The master piston 10 has a first piston 11, second piston 12 and third piston 13 which is fluid-tightly and slidably received in the second piston 12. The first piston 11 has a land portion $11a$ of a relatively small diameter formed around its outer periphery at its front end portion, and a land portion $11b$ of a relatively large diameter formed at its rear end portion which is away from the land portion $11a$ by a certain distance. The land portion $11a$ is provided with an annular cup-like sealing member 14 to be fluid-tightly and slidably received in the bore $1b$, while the land portion $11b$ is slidably received in the bore $1a$ in abutment with the second piston 12. The second piston 12 has a land portion $12a$ on which a circumferential groove $12b$ is formed for receiving therein an annular sealing member. The inside of the second piston 12 is formed into a stepped bore of a small diameter bore $12c$, intermediate diameter bore $12d$ and large diameter bore $12e$, and a valve seat $12f$ is formed between the bore $12c$ and bore $12d$. The second piston 12 is formed with a passage $12g$ behind the valve seat $12f$ to communicate the bore $12d$ with the power chamber R1. A main body of the second piston 12 is supported by a cylindrical sleeve 17. On the inner periphery and outer periphery of the sleeve 17, circumferential grooves are formed to receive therein sealing members $17a$, $17b$, and on the inner periphery of the sleeve 17 axially remote from the sealing members $17a$, $17b$, a circumferential groove is formed to receive therein a sealing member 18 thereby to seal the power chamber R1 effectively.

Accordingly, between the land portion $11a$ of the first piston 11 and the land portion $12a$ of the first piston 12 within the bores $1a$, $1b$, is defined a fluid chamber R4 which is communicated with the reservoir 4 through a port $1e$ and communicated with the inside of the second piston 12 through a port $11d$ which is formed in the first piston 11. The third piston 13, i.e., the input piston according to the present invention, is fluid-tightly and slidably received in the inside of the second piston 12, and so arranged that its front end faces the valve seat $12f$ of the second piston 12 with a certain distance apart therebetween, thereby to form the pressure decreasing device according to the present invention, together with the first piston 11 and etc. The third piston 13 has a through hole $13a$ formed radially at its front end, through which a pin 15 is penetrated and secured to the second piston 12. The through hole $13a$ has the axial length longer than the diameter of the pin 15, so that the third piston 13 is movable relative to the second piston 12. On the third piston 13 are formed a pair of circumferential grooves (represented by $13b$) in which annular sealing members are received. And, a large diameter portion $13c$ is formed at the rear end of the third piston 13 to connect with the push rod 3.

At the front portion of the cylinder body $1h$, there is formed the regulator section which is connected to an auxiliary pressure source 40 for supplying a power pressure therefrom. The auxiliary pressure source 40 includes an electric motor 42 and a fluid pump 43 driven by the motor 42, and its inlet is connected to the reservoir 4 and its outlet is connected to an accumulator 44 through which the power pressure is supplied to a passage $31d$ via a port $1p$. The control piston 21 has a pair of land portions formed around its outer periphery with a certain distance apart axially therebetween, and received in the bore $1b$, whereby a fluid chamber R5 is defined between the land portions.

As shown in FIG. 1, the control piston 21 has a through hole $21a$ formed radially and an axial passage $21b$ communicated with the through hole $21a$, so that one end of the passage $21b$ is communicated with the fluid chamber R5 and the other end is communicated with the pressure chamber R2. The fluid chamber R5 is communicated with the reservoir 4 through a port $1f$. At the rear land portion of the control piston 21, an axial passage $21c$ is formed. An annular sealing member 24 is disposed at an end of the passage $21c$ opening to the pressure chamber R2, so that a one-way valve is formed. The pressure chamber R2 is, therefore, defined between the sealing member 24 and a sealing member 14 which is disposed on the land portion $11a$ of the first piston 11.

The control piston 21 has a cylindrical support portion $21s$ integral therewith to enclose the passage $21b$ extending axially, and a valve member 25 is slidably disposed in the support portion $21s$. One end of the valve member 25 is covered by a resilient material such as rubber which can abut on the passage $21b$ to close the same. At the other end of the valve member 25, a rod $25b$ is formed to be integral with the valve member 25, and an engaging portion $25c$ is formed at the rear end of the rod $25b$. A retainer 26 is mounted on the support portion $21s$, and engaged with the engaging portion $25c$ to restrain the valve member 25 from moving toward the master piston 10. Likewise, the first piston 11 has a cylindrical support portion $11s$ formed at the side of the land portion $11a$ to enclose the recess $11c$. A retainer 16 is mounted on the support portion $11s$, and engaged with the engaging portion $25c$ to restrain the valve member 25 from moving toward the control piston 21. At the axial end of the control piston 21 opposite to the retainer 26, is formed a recess in which an end portion of a spool 32 is held as described later. The through hole 21a receives therein an engaging pin 28 which is fixed to the cylinder body 1h, so that the control piston 21 is allowed to move forward, but restrained from moving backward (i.e., restrained from moving toward the first piston 11).

A cylindrical sleeve 31 is received in the stepped bore 1c which is communicated with the bore 1b. The sleeve 31 has a plurality of circumferential grooves formed around its periphery, and annular sealing members are received in the grooves, respectively. Between the neighboring sealing members are formed radial passages 31d, 31e to communicate the ports 1p, 1s with the inside of the sleeve 31, in which the spool 32 is slidably received, and the front end of which is closed by a plug 31a.

In the spool 32, are formed an axial passage 32a and a radial throttle passage 32b communicated with the passage 32a. One end of the spool 32 is placed in a regulator chamber R3 and engaged with the control piston 21. A retainer 33 is supported in the recess of the control piston 21, and a spring 34 is mounted between the sleeve 31 and the retainer 33 to urge the spool 32 to abut on the control piston 21. The axial passage 32a is so arranged that its open end normally opens in the regulator chamber R3 at the junction of the spool 32 and the control piston 21. When the control piston 21 is placed in its initial position, the other end of the passage 32a of the spool 32 is arranged to be communicated with the reservoir 4 through a passage 31e and a port 1s, so that the regulator chamber R3 is communicated with the reservoir 4 to be filled with the brake fluid under the atmospheric pressure.

The passage 31d is formed in the sleeve 31 so as to be communicated with the auxiliary pressure source 40 through the port 1p, while it has been closed by the spool 32 as shown in FIG. 1. A circumferential groove 31c is formed on the inner periphery of the sleeve 31 with a certain distance away from the passage 31d, and a circumferential groove 32c is formed on the outer periphery of the spool 32 to face with the groove 31c. Accordingly, when the spool 32 is placed at its position as shown in FIG. 1, the regulator chamber R3 is communicated with the reservoir 4 through the passage 32a of the spool 32, the passage 31e of the sleeve 31 and the port 1s to be under the atmospheric pressure. When the spool 32 is moved toward the plug 31a in response to movement of the control piston 21, the groove 31e of the sleeve 31 is shut off, and in turn the passage 31d of the sleeve 31 faces the groove 32c of the spool 32 and at the same time the groove 31c faces the throttle passage 32b, so that the regulator chamber R3 is communicated with the passage 32a. Consequently, the power pressure is supplied from the auxiliary pressure source 40 into the regulator chamber R3 to increase the pressure therein. The regulator chamber R3 is communicated with the power chamber R1 through a port 1r formed in the cylinder body 1h.

The operation of the above-described hydraulic brake apparatus will be explained hereinafter. When the brake pedal 2 is not depressed as shown in FIG. 1, between the tip end and the valve seat 12f is formed a clearance (or passage) through which the power chamber R1 is communicated with the fluid chamber R4. When the brake pedal 2 is depressed to push the second piston 13 forward (to the left in FIG. 1) through the push rod 3, the tip end of the third piston 13 abuts on the valve seat 12f to shut off the communication between the power chamber R1 and the fluid chamber R4, then the first piston 11 is moved by the depressing force of the brake pedal 2 to compress the pressure chamber R2. Accordingly, the valve member 25 abuts on the control piston 21 to close the passage 21b by the resilient member of the valve member 25. In this case, since the master piston 10 and the control piston 21 are held to be in the condition as shown in FIG. 1 through a spring 19, they move together in a body. Then, the spool 32 engaged with the control piston 21 will shut off the passage 31e to block the communication between the reservoir 4 and the regulator chamber R3. At the same time, the power pressure is supplied from the auxiliary pressure source 40 into the regulator chamber R3 through the port 1p, passage 31d, grooves 31c, 32c, and throttle passage 32b, thereby to be fed into the wheel cylinder Wrr through a port 1q as a regulated pressure, and also fed into the power chamber R1 through the port 1r. Whereby, the first and second pistons 11, 12 are moved forward, so that the pressure chamber R2 is compressed to generate the master cylinder pressure from the port 1n. In this case, the movement of the first piston 11 is assisted by the regulated pressure supplied in response to depression of the brake pedal 2, because the sealing diameter of the land portion 12a of the second piston 12 is larger than the sealing diameter of the land portion 11a of the first piston 11.

During this operation, if the regulated pressure becomes greater than the master cylinder pressure, the control piston 21 is actuated to move away from the sleeve 31, so that the passage 32a of the spool 32 is communicated with the reservoir 4, thereby to decrease the pressure in the regulator chamber R3. Whereas, if the regulated pressure becomes smaller than the master cylinder pressure, the passage 31e is shut off, and in turn the power pressure is introduced from the auxiliary pressure source 40 through the passage 31d into the regulator chamber R3 to increase the pressure therein. Thus, the pressure in the regulator chamber R3 is regulated by repetition of the movement of the control piston 21 as described above and the movement of the spool 32 activated in accordance with the movement of the control piston 21.

In the case where the master piston 10 is being actuated, if the brake pedal 2 is released, or the braking force applied to the brake pedal 2 is cut off, the tip end of the third piston 13 is moved away from the valve seat 12f because the third piston 13 is connected to the brake pedal 2 through the push rod 3. As a result, the power chamber R1 is communicated with the reservoir 4 through the passage 11d and the fluid chamber R4 to decrease the pressure in the power chamber R1 immediately.

Figure 2:
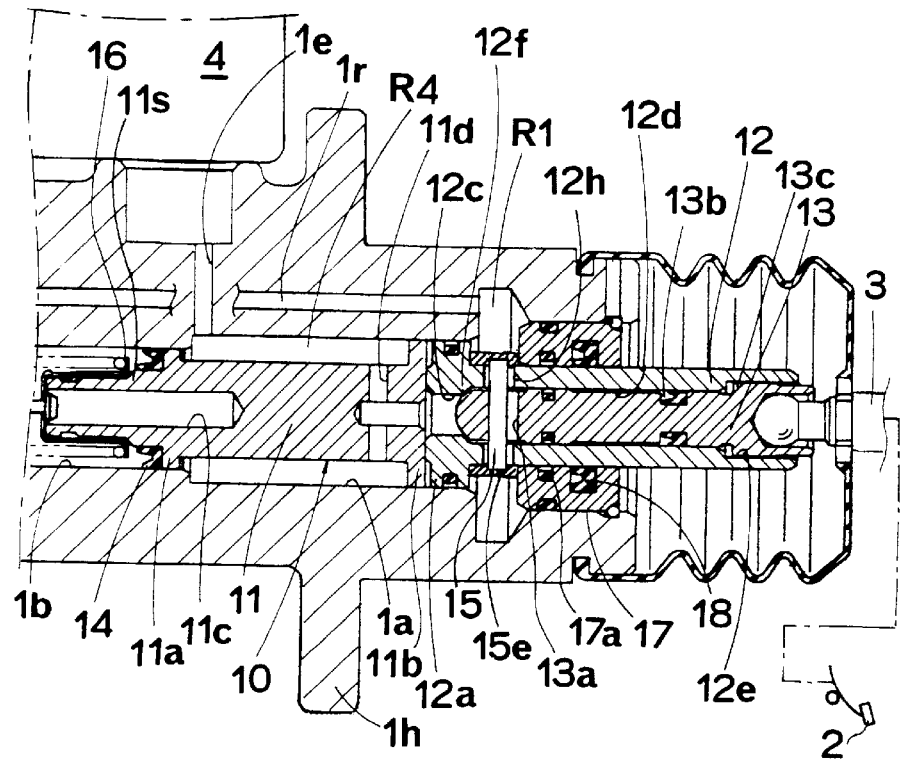
FIG. 2 is a sectional view of a part of a hydraulic brake apparatus for a vehicle according to another embodiment of the present invention.

FIG. 2 illustrates a part of another embodiment of the hydraulic brake apparatus according to the present invention. The master piston 10 is different in structure from that as shown in FIG. 1, but the rest of the components are the same as those as shown in FIG. 1, so that they are omitted in FIG. 2. According to the present embodiment, the third piston 13 having the same structure as that as shown in FIG. 1 is arranged to be normally held to be seated on the valve seat 12f of the second piston 12, so that a normally closed valve is constituted. The second piston 12 has a guide hole 12h which is formed radially, and through which the pin 15 is penetrated. At opposite ends of the pin 15 are fixed engaging members 15e by which the pin 15 is supported so as to be movable in the guide hole 12h. Therefore, when the brake pedal 2 is in its inoperative condition, the pin 15 abuts on the sleeve 17. When the brake pedal 2 is depressed, the pin 15 advances together with the second piston 12. According to the present embodiment, the pin 15 is arranged to penetrate the through hole 13a and moved together with the third piston 13 in a body, so that the relationship between the pin 15 and the third piston 13 is different from that in FIG. 1. The pin 15 may be formed to be integral with the third piston 13 in the present embodiment.

According to the present embodiment, the tip end of the third piston 13 has been seated on the valve seat 12f in the inoperative condition of the brake pedal 2, so that the communication between the power chamber R1 and the fluid chamber R4 has been blocked. When the brake pedal 2 is depressed to push the third piston 13 forward (to the left in FIG. 2), the third piston 13 is advanced with its tip end seated on the valve seat 12f. Therefore, the communication between the power chamber R1 and the fluid chamber R4 is maintained to be blocked, so that the regulated pressure is applied to the second piston 12. Consequently, the first piston 11 is moved by the depressing force of the brake pedal 2 and the regulated pressure applied to the second piston 12, thereby to compress the pressure chamber R2. Then, in the case where the master piston 10 is being actuated, if the brake pedal 2 is released, or the braking force applied to the brake pedal 2 is cut off, the third piston 13 connected to the second piston 12 is moved backward, so that the 15 is moved backward in the guide hole 12h. As a result, the tip end of the third piston 13 is moved away from the valve seat 12f, the power chamber R1 is communicated with the reservoir 4 through the fluid chamber R4 to decrease the pressure in the power chamber R1 immediately. According to the present embodiment, therefore, appropriate braking operation is ensured, without the pressure decreasing operation delayed. Furthermore, since the normally closed valve is formed in the master piston 10, feeling to the vehicle's driver in the braking operation can be improved.

Figure 3:
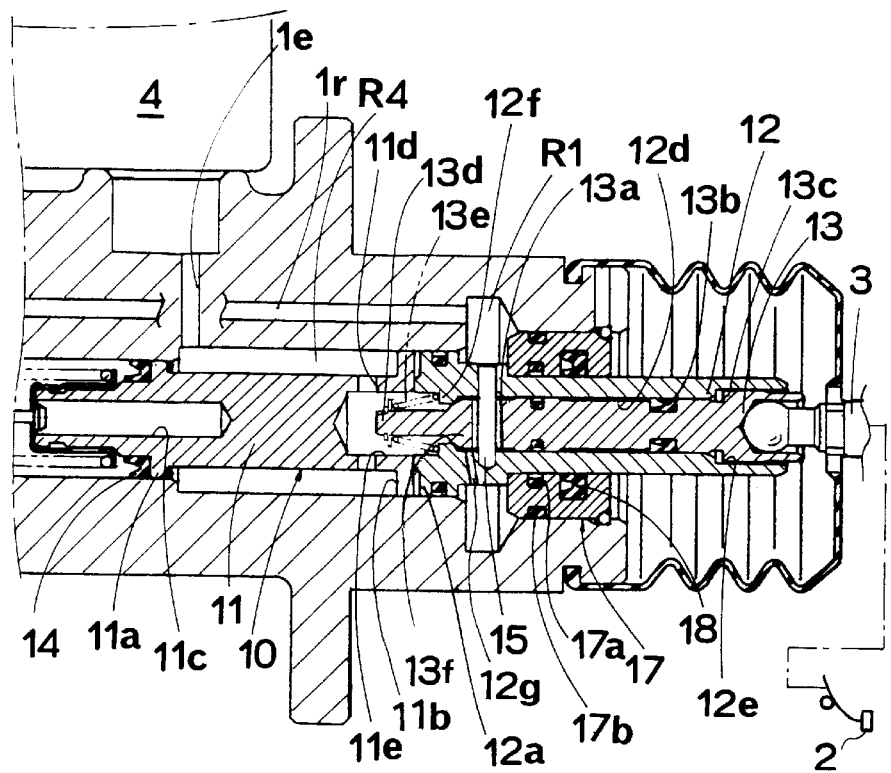
FIG. 3 is a sectional view of a part of a hydraulic brake apparatus for a vehicle according to a further embodiment of the present invention.

FIG. 3 illustrates a part of a further embodiment of the hydraulic pressure apparatus according to the present invention. The master piston 10 is different in structure from that as shown in FIG. 1, but the rest of the components are the same as those as shown in FIG. 1. According to the present embodiment, on the rear end of the first piston 11 is formed a recess 11e which is communicated with the fluid chamber R4 through the passage 11d. The third piston 13 has an extended portion 13d of smaller diameter than that of its main body on its tip end to be received in the recess 11e, and the stepped portion 13f between the extended portion 13d and the main body. Behind the stepped portion 13f of the third piston 13, the radial through hole 13a is formed. The pin 15 for penetrating the through hole 13a is fixed to the second piston 12. In front of the valve seat 12f of the second piston 12, a stepped portion is formed. Then, a spring 13e is disposed between the stepped portion and the tip end of the extended portion 13d so as to urge the stepped portion 13f of the third piston 13 to seated on the valve seat 12f of the second piston 12, so that a normally closed valve is constituted.

According to the present embodiment, the stepped portion 13f of the third piston 13 has been seated on the valve seat 12f in the inoperative condition of the brake pedal 2, so that the communication between the power chamber R1 and the fluid chamber R4 has been blocked. When the brake pedal 2 is depressed to push the third piston 13 forward (to the left in FIG. 3), the third piston 13 is advanced with its stepped portion 13f seated on the valve seat 12f. Therefore, the communication between the power chamber R1 and the fluid chamber R4 is maintained to be blocked, so that the regulated pressure is applied to the second piston 12. Consequently, the first piston 11 is moved by the depressing force of the brake pedal 2 and the regulated pressure applied to the second piston 12, thereby to compress the pressure chamber R2. Then, in the case where the master piston 10 is being actuated, if the brake pedal 2 is released, or the braking force applied to the brake pedal 2 is cut off, the third piston 13 is moved backward relative to the second piston 12 against the biasing force of the spring 13e. As a result, the stepped portion 13f of the third piston 13 is moved away from the valve seat 12f, the power chamber R1 is communicated with the reservoir 4 through the passage 12g, recess 11e, passage 11d and fluid chamber R4 to decrease the pressure in the power chamber R1 immediately. According to the present embodiment, therefore, appropriate braking operation is ensured, without the pressure decreasing operation delayed. Furthermore, since the normally closed valve is formed in the master piston 10, feeling to the vehicle's driver in the braking operation can be improved.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A hydraulic brake apparatus for a vehicle comprising:

a master cylinder having a cylinder body and a master piston slidably disposed therein for defining a pressure chamber ahead of said master piston and a power chamber behind said master piston, said master piston being moved forward in response to operation of a manually operated member to generate a brake pressure from said pressure chamber;

a control piston slidably disposed in said cylinder body ahead of said master piston for defining said pressure chamber behind said control piston, said control piston being moved in response to movement of said master piston;

an auxiliary pressure source for pressurizing brake fluid to generate a power pressure;

valve means having a regulator chamber defined ahead of said control piston and communicated with said auxiliary pressure source for regulating the power pressure into a regulated pressure in response to movement of said control piston, said valve means supplying the regulated pressure into said power chamber to assist the operation of said manually operated member; and pressure decreasing means activated in response to operation of said manually operated member for decreasing the pressure in said power chamber irrespective of the pressure in said pressure chamber when said manually operated member is released.

2. A hydraulic brake apparatus for a vehicle as recited in claim 1, wherein said pressure decreasing means is disposed in said master piston in an integral relationship with said manually operated member.

3. A hydraulic brake apparatus for a vehicle as recited in claim 1, wherein said valve means is adapted to keep said power chamber in communication with a reservoir for storing the brake fluid therein when said manually operated member is in its inoperative condition, and wherein said pressure decreasing means is adapted to communicate said power chamber with said reservoir when said manually operated member is in its inoperative condition, and adapted to block the communication between said power chamber and said reservoir when said manually operated member is operated, and adapted to communicate said power chamber with said reservoir when said manually operated member is released.

4. A hydraulic brake apparatus for a vehicle as recited in claim 3, wherein said pressure decreasing means is disposed in said master piston for selectively providing one of a first state of communicating said power chamber with said reservoir and a second state of blocking the communication between said power chamber and said reservoir in accordance with a position of said master piston in said cylinder body.

5. A hydraulic brake apparatus for a vehicle as recited in claim 4, wherein said master piston includes a cylindrical member slidably disposed in said cylinder body, and an input piston slidably disposed in said cylindrical member for being moved in response to operation of said manually operated member, and wherein said pressure decreasing means includes a passage formed between said input piston and said cylindrical member for communicating said power chamber with said reservoir, said passage being opened or closed in response to movement of said input piston.

6. A hydraulic brake apparatus for a vehicle as recited in claim 1, wherein said valve means is adapted to keep said power chamber in communication with a reservoir for storing brake fluid therein when said manually operated member is in its inoperative condition, and wherein said pressure decreasing means is adapted to block the communication between said power chamber and said reservoir when said manually operated member is in its inoperative condition and when said manually operated member is operated, and adapted to communicate said power chamber with said reservoir when said manually operated member is released.

7. A hydraulic brake apparatus for a vehicle as recited in claim 6, wherein said pressure decreasing means is disposed in said master piston for selectively providing one of a first state of communicating said power chamber with said reservoir and a second state of blocking the communication between said power chamber and said reservoir in accordance with a position of said master piston in said cylinder body.

8. A hydraulic brake apparatus for a vehicle as recited in claim 7, wherein said master piston includes a cylindrical member slidably disposed in said cylinder body, and an input piston slidably disposed in said cylindrical member for being moved in response to operation of said manually operated member, and wherein said pressure decreasing means includes a passage formed between said input piston and said cylindrical member for communicating said power chamber with said reservoir, said passage being opened or closed in response to movement of said input piston.

9. A hydraulic brake apparatus for a vehicle as recited in claim 6, wherein said pressure decreasing means is disposed in said master piston for selectively providing one of a first state of communicating said power chamber with said reservoir and a second state of blocking the communication between said power chamber and said reservoir in dependence upon the pressure in said power chamber.

10. A hydraulic brake apparatus for a vehicle as recited in claim 9, wherein said master piston includes a cylindrical member slidably disposed in said cylinder body, and an input piston slidably disposed in said cylindrical member for being moved in response to operation of said manually operated member, and wherein said pressure decreasing means includes a passage formed between said input piston and said cylindrical member for communicating said power chamber with said reservoir, said passage being opened or closed in response to movement of said input piston.

11. A hydraulic brake apparatus for a vehicle as recited in claim 1, wherein said valve means comprises:

a spool engaged with a front end of said control piston within said regulator chamber; and a sleeve disposed in said cylinder body for slidably receiving therein said sleeve, said spool being moved relative to said sleeve in response to movement of said control piston to introduce the power pressure from said auxiliary pressure source into said regulator chamber and generate the regulated pressure therefrom.

* * * * *